United States Patent [19]
Butler et al.

[11] Patent Number: 5,277,401
[45] Date of Patent: Jan. 11, 1994

[54] TANK BOTTOM DIAPHRAGM VALVE

[75] Inventors: Ronald G. Butler, Mountville; Richard D. Randall, York; Wayne R. Houck, Columbia, all of Pa.

[73] Assignee: ITT Corporation, New York, N.Y.

[21] Appl. No.: 686,715

[22] Filed: Apr. 17, 1991

[51] Int. Cl.⁵ .................................................. F16K 7/16
[52] U.S. Cl. .................................... 251/144; 251/331; 222/559
[58] Field of Search ............... 251/144, 331; 222/559, 222/564, 185, 505

[56] References Cited

U.S. PATENT DOCUMENTS

| | | | |
|---|---|---|---|
| 3,134,570 | 5/1964 | Jarrett | 251/331 |
| 4,251,053 | 2/1981 | Wurzer | 251/331 |
| 4,280,680 | 7/1981 | Payne | 251/331 X |
| 4,505,451 | 3/1985 | Jones | 251/331 X |
| 4,784,174 | 11/1988 | Ryan | 251/144 X |
| 4,819,691 | 4/1989 | Löfgren et al. | 251/331 X |
| 4,836,236 | 6/1989 | Ladisch | 251/144 X |
| 5,065,980 | 11/1991 | Pedersen | 251/144 |

Primary Examiner—Martin P. Schwadron
Assistant Examiner—Kevin L. Lee
Attorney, Agent, or Firm—Menotti J. Lombardi

[57] ABSTRACT

A diaphragm valve which mounts directly on a tank bottom provides positive isolation between the vessel and downstream piping. When closed, the diaphragm seals against the valve body weir to seal the valve, and when opened, the valve provides a smooth, crevice free, drainable passageway to the downstream piping.

11 Claims, 4 Drawing Sheets

TANK BOTTOM DIAPHRAGM VALVE

BACKGROUND OF THE INVENTION

This invention relates to diaphragm valves, and more particularly to diaphragm valves which are designed to mount to tank bottoms of sterile vessels.

Similar devices include ball valves, quarter turn valves which have a ported sphere and a pair of seats in a housing. When open, fluid flows from one end of the valve through the ball and out the other end. Rotating the ball 90 degrees closes the valve and prevents fluid flow. The ball may be fixed or floating Plunger valves are linear motion valves which create a seal by forcing an elastomeric boot into a seat area. When the valve opens, the boot convolutes on itself to provide fluid flow. A ram valve is a linear motion valve which consists of a spindle/ piston combination. The seal is typically metal to metal. Another linear motion valve similar to a ram valve is the kettle valve, but a molded elastomer seal, mushroom shaped, is on the end of the shaft.

The foregoing valves are not ideally suited to process fluids in the pharmaceutical/bioprocessing industries. These valves have many limitations including too large in size, they generate a large sump at the vessel bottom and generate crevices in which bacteria can grow, they trap fluid in ball cavity which requires cavity fillers and steam ports to clean, they have poor interior finish and have non-streamlined fluid passages, they do not isolate the working parts from the line fluid, they do not provide positive closure and are not autoclavable, and they contain welds, i.e. mounting flange is normally welded to valve body.

The state of the art of diaphragm valves are known from the following U.S. Pat. Nos.:

| | |
|---|---|
| 1,497,275 | 3,250,511 |
| 2,186,833 | 3,349,795 |
| 2,605,991 | 3,623,700 |
| 2,616,164 | 3,628,770 |
| 2,725,211 | 3,631,882 |
| 2,892,613 | 4,505,451 |
| 3,134,286 | 4,596,268 |
| 3,134,571 | |

The state of the art for valves used in connection tanks are known from the following U.S. Pat. Nos.:
2,679,860
3,665,946
3,895,651
3,918,678
4,836,236

The tank bottom diaphragm valve according to the invention overcomes the above problems by employing the inherent design features of the diaphragm valves which include positive closure, zero pockets, minimal contact surfaces, streamlined fluid passage, bonnet isolation, and ease of maintenance. The tank bottom diaphragm valve of the invention provides a clean, totally drainable means to isolate the vessel from downstream process piping, and the overall dimensional envelope is minimal and all materials of construction are FDA compliant and autoclavable.

SUMMARY OF THE INVENTION

An object of the invention is to provide a tank bottom diaphragm valve which mounts directly on a tank bottom and provides positive isolation between the vessel and downstream piping with minimal dead space.

According to the broader aspects of the invention when closed, an elastomer or plastic diaphragm seals against a body weir contour to seal the valve. Opening the valve creates a smooth, crevice free passageway to downstream piping. The valve is drainable, which prevents contaminants resulting from trapped fluids.

A feature of the invention is that the valve body/flange is one piece, machined from either bar stock or a forging, and can be welded directly to the tank. Other designs are multi-piece, using bolted fasteners or weldments. The elimination of additional welds improves the valve body integrity and reduces sources of contamination. The diaphragm seal area is very close to the bottom of the tank and a smooth transition insures proper solution mixing.

BRIEF DESCRIPTION OF THE DRAWINGS

Other objects, features and advantages of the present invention will become more fully apparent from the following detailed description of the preferred embodiment, the appended claims, and the accompanying drawings in which:

DETAILED DESCRIPTION OF THE EMBODIMENT

Figure 1:
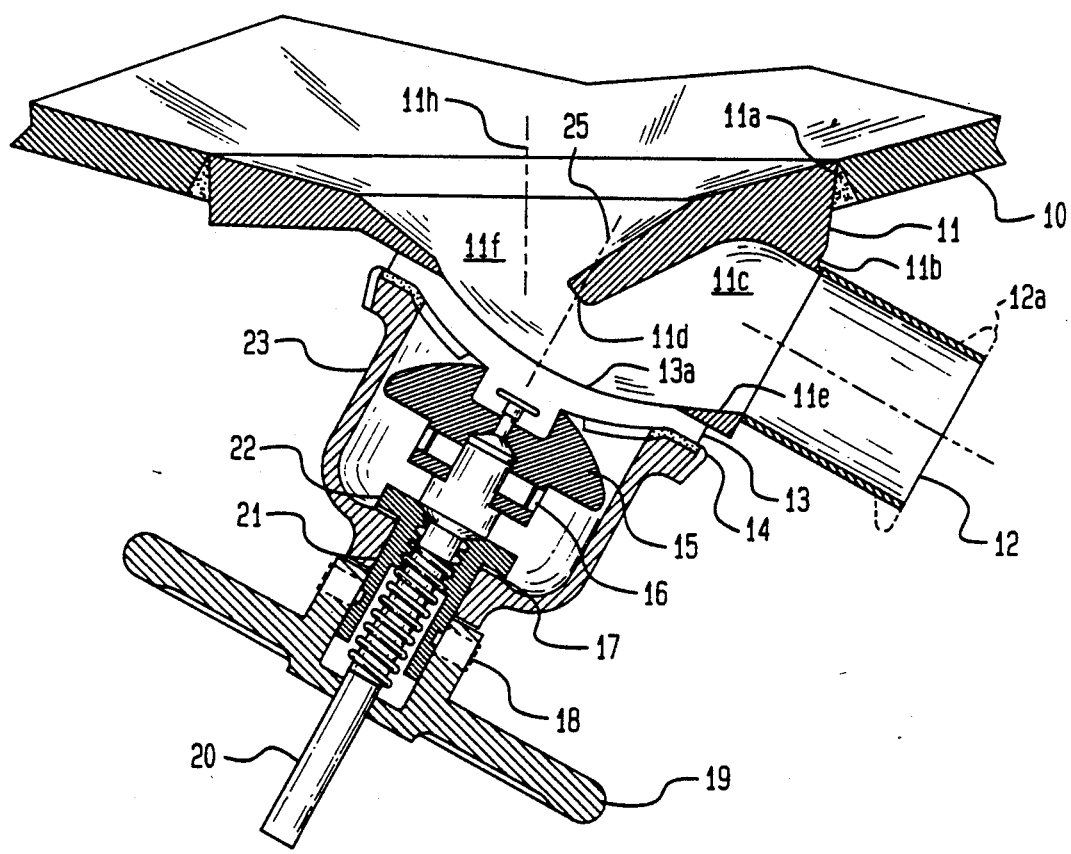
FIG. 1 is a cross-sectional view of the tank bottom valve in the open position.

Referring to FIG. 1, a diaphragm valve designed to mount in a tank bottom 10 is illustrated. The stainless steel valve body 11 is normally welded about its periphery 11a to the tank bottom. A tube extension 12 which may include a flange 12a is welded at the buttweld lip, point 11b at the exit passage 11c.

In addition to the valve body 11, the diaphragm valve includes a elastomer or TFE diaphragm 13, a steel or stainless steel finger plate 14, a zinc, iron, or coated iron compressor 15, a stainless steel pin 16, a steel or stainless steel thrust bearing 17, a steel or stainless steel set screw 18, an iron, or coated iron handwheel 19, a stainless steel spindle 20, a plastic shim washer 21, a brass or stainless steel bushing 22, and a bonnet 23 made of iron, coated iron, bronze, steel, or stainless steel. Bonnet 23 is fixed to the valve body 11 by studs and nuts (not shown) in a normal manner. Typical coating materials are nylon and PVDF.

Figure 2:
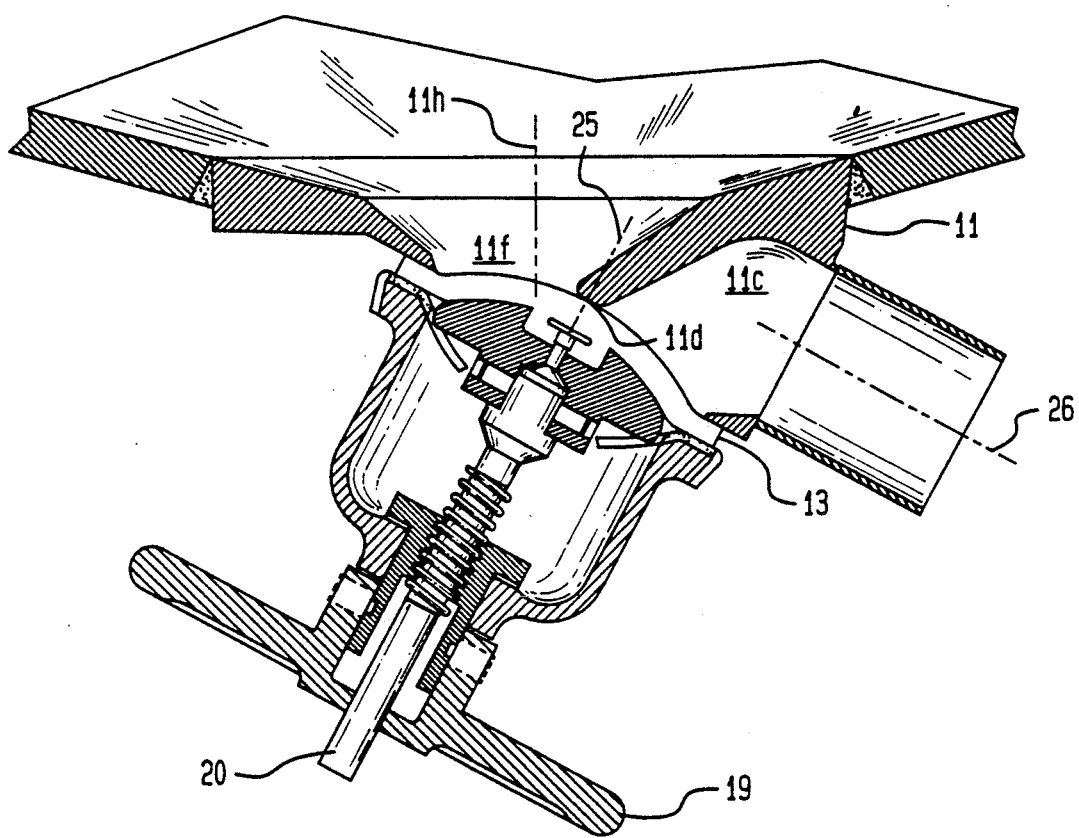
FIG. 2 is a cross-sectional view of the tank bottom valve shown in FIG. 1 in the closed position.

Turning of hand wheel 19 will cause movement of spindle 20 along axis 25. Referring additionally to FIG. 2, the spindle 20 has moved the diaphragm 13 into a closed position in which the diaphragm 13 closes against concave seat 11d to close drain thru passage 11f. Although a hand wheel is shown, other means such as pneumatic or electrical actuators may be used to move the spindle.

Figure 3:
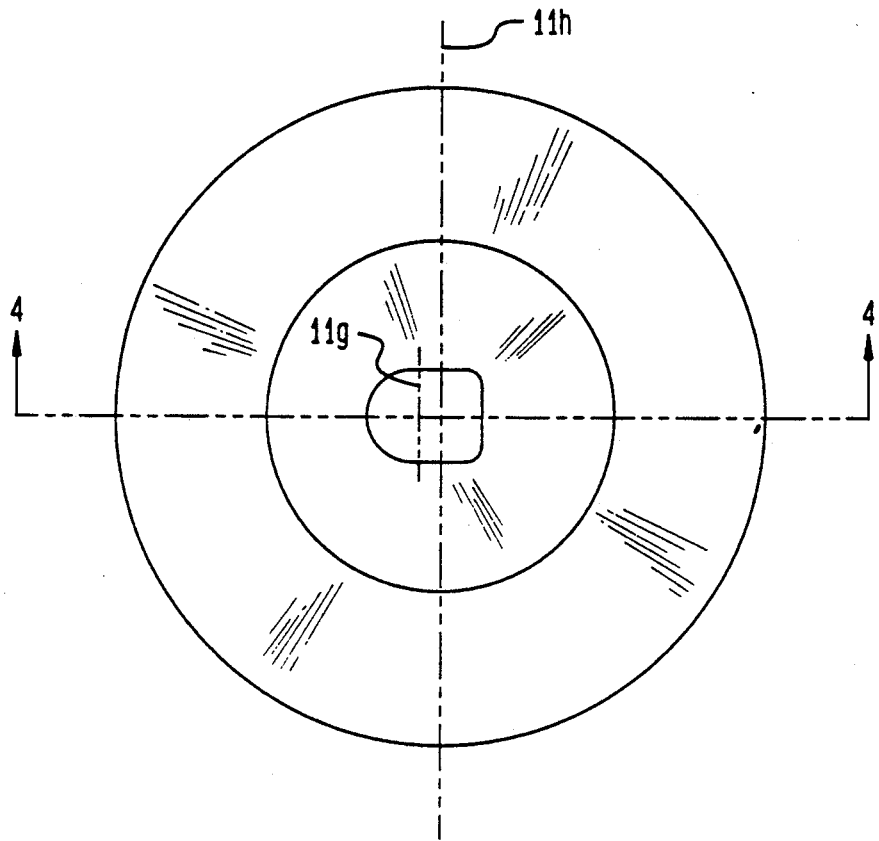
FIG. 3 is a top view of the valve body.

Referencing FIG. 3, it can be seen that the drain thru port centerline 11g is as close to the body centerline 11h as possible. This minimizes the dead space from the tank bottom to the valve diaphragm seal. In many tank applications, the fluid must be continually mixed and kept in solution. A minimum dead space is crucial to insure continuous mixing. The valve body must have a smooth, crevice-free exit passageway.

Figure 4:
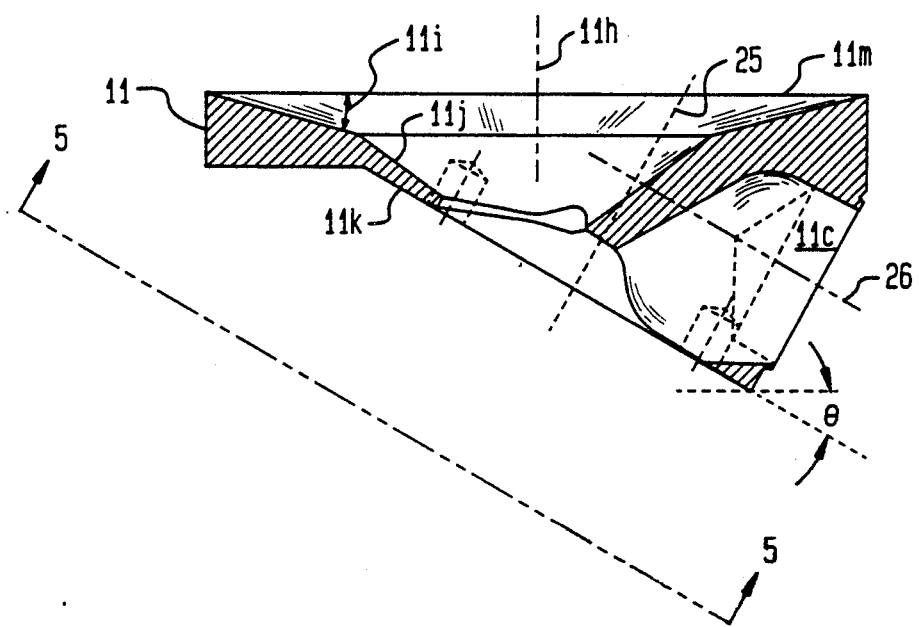
FIG. 4 is a cross-sectional view of the valve body of FIG. 3 taken along lines 4—4.

FIG. 4 shows several key geometry relationships which exist in the valve body. Centerline 26 of exit port 11c is perpendicular to axis 25. A typical tank bottom has a slope angle of 15 to 20 degrees and the valve body angle 11i matches this slope to insure a smooth transition from the tank to valve body as shown in FIGS. 1 and 2. A second transition (11j) occurs on some valve sizes to blend the valve body toward the diaphragm seal area. This reduces the vertical dead space and insures proper mixing of process fluid within tank.

Drainability is the key to a successful tank valve application and the valve body is designed to insure drainability. The body's bonnet mounting face 11k has an angular relationship to the top planar surface 11m. The angular relationship is established from a combination of the valve stroke and diaphragm geometry in the open position. In the preferred embodiment angle $\theta$ is approximately 30 degrees from the horizontal plane which is parallel to surface 11m. The orientation is such that the surface 13a of diaphragm 13 at its lowest point (shown in FIG. 1) in the full open position is equal to or higher than the high point of the connection surface 11e to the downstream passage 11c. It is of great importance that no pockets exist in which fluids can be trapped. Also, the valve minimum wall thicknesses must insure adequate strength to withstand pressure up to 150 PSI within the tank.

Also critical to the design of the body are the drain passages. The passage 11f from tank to valve and the passage 11c from the valve to downstream piping must be sufficiently large so as not to restrict flow. A tank must drain quickly to avoid rings in the tank on which contamination can grow. Another feature of the valve body is the ability to have a buttweld tube extension 12, tri-clamp, or other end available on the downstream side. The body 11, being unitary and cylindrical in shape, may be welded to the tank bottom throughout a 360 degree potential rotation to accommodate the downstream piping.

Figure 5:
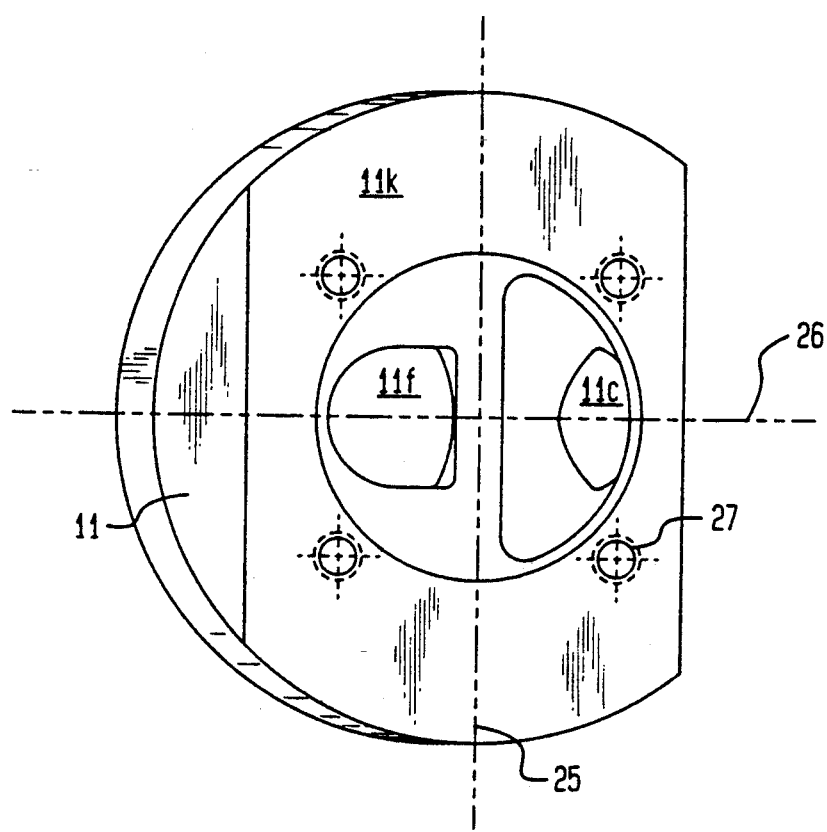
FIG. 5 is a bottom view of the valve body as viewed from lines 5—5 of FIG. 4.

FIG. 5 shows a bottom view of the valve taken along lines B—B of FIG. 4. It shows the valve body 11 less the bonnet and diaphragm assembly. The tank drain passage 11f, the weir centerline 25, centerline 26 of exit passage 11c which connects to the downstream piping are illustrated. The bonnet mounting face 11k has a plurality of tapped holes 27 for mounting the bonnet.

While the present invention has been disclosed in connection with a preferred embodiment thereof, it should be understood that there may be other embodiments which fall within the spirit and scope of the invention as defined by the following claims.

What is claimed is:

1. A diaphragm valve for a tank bottom with a slope which in an open position is completely drainable and without pockets comprising:
   a valve body having a surface for fixedly attaching to said tank bottom, said body having a drain thru passage with an axis perpendicular to said surface and a downward sloping exit passage with a traverse weir there between, wherein said drain thru passage has an initial slope which matches said tank bottom slope to insure a smooth transition from tank bottom to said valve body;
   said body having another surface at an angle of approximately 30 degrees with respect to said surface;
   means being mounted on said other surface an angularly displaced with respect to said drain thru passage of said body for movement of a diaphragm against and away from said weir to effect closure and opening of said drain thru passage, said diaphragm having a smooth, crevice-free surface adjacent said rain thru passage; and
   said diaphragm in the open position having its lowest surface point equal to or higher than a connection surface forming part of the downward sloping exit passage to insure complete drainability from the tank bottom of both said tank bottom and valve.

2. The valve according to claim 1, wherein said means for movement of said diaphragm is isolated from said drain thru passage by said diaphragm.

3. A tank bottom diaphragm valve being formed without pockets to enable in an open position total drainability of a tank bottom with a slope and the valve comprising:
   a notary formed, cylindrically shaped, valve body, said body having a first planar surface for securing to said tank bottom and a second planar surface formed at an angle of approximately 30 degrees to said first surface;
   said body having a drain thru passage with an axis perpendicular to said first surface and an exit passage angularly displaced downward with a transverse weir extending across said passages, wherein said rain thru passage has an initial slope which transitions with said tank bottom slope to insure a smooth transition from said tank bottom to said valve body;
   a bonnet being secured to said second surface and having mounted therein compressor means;
   a diaphragm being positioned between said compressor and said weir for movement toward and away from said weir, and having a smoothly, crevice-free surface adjacent said weir and its periphery fixed between said second surface and bonnet; and
   said diaphragm in the open position, away from said weir having its least surface point equal to or higher than a connection surface forming the lowest pat of the exit passage to enable total drainability of both said tank and valve.

4. The valve according to claim 3 wherein the initial slope is approximately 15 to 20 degrees from said first surface.

5. The valve according to claim 3 including a tube extension welded to said body at the exit passage.

6. A diaphragm valve without packets for mounting to a tank bottom with a slope to enable in an open position total drainability of the tank bottom and valve to downstream piping comprising:
   a valve body for fixedly attaching to said tank bottom, said body having a drain thru passage with an axis perpendicular to said tank bottom and an exit passage with an exit axis angularly displaced downward there from with a tranverses weir there between, wherein said drain thru passage has an initial slope which conforms to said tank bottom slope to cause a smooth transition from said tank bottom to said valve body;
   bonnet means being mounted said body and angularly displaced with respecty to drain thru passage axis, said connect means containing means for movement of a diaphragm along another axis against and away from said weir to effect closure and opening of said drain thru passage;

said exit axis is perpendicular to said other axis, and said diaphragm has a smooth, crevice-free surface adjacent said drain thru passage and in an open position has its lowest surface point higher than a connection surface forming the lowest part of the exit passage to enable total drainability of said tank bottom and valve; and means for coupling said exit passage to downstream piping.

7. The valve according to claim 6, wherein said means for movement of said diaphragm is isolated from said drain thru passage by said diaphragm.

8. The valve according to claim 7, wherein said valve body is a unitary formed body in which surface mounted to the tank body is at an angle of approximately 30 degrees with the surface for mounting said bonnet means.

9. A tank bottom diaphragm valve which is pocketless and mounts directly on a tank bottom with a slope to provide when closed isolation between the tank and downstream piping, and when open to permit complete drainage of the tank and valve, comprising in combination:

a unitary formed, cylindrically shaped, valve body, said body having a first planar surface for securing to said tank bottom and a second planar surface formed at an angel of approximately 30 degrees to said first surface;

said body having a drain thru passage with an axis perpendicular to said first plain surface and a downward sloping exit passage with an exit axis, and a transverse weir extending across said passages, wherein said drain thru passage has an initial slope which matches said tank bottom slope to form a smooth transition from said tank bottom to said vale body;

a bonnet being secured to said second surface and having mounted therein compressor means;

a diaphragm being positioned between said compressor and said weir for movement along another axis perpendicular to said exit axis toward and away from said weir, and having a smooth, crevice-free surface adjacent said weir and its periphery fixed between said second surface and bonnet; and said diaphragm in an open position, away from said weir has its lowest surface point equal to or higher than the lowest surface point of its exit passage.

10. The valve according to claim 9 wherein the initial slope is approximately 15 to 20 degrees from said first surface.

11. The valve according to claim 10 including a secondary slope greater than said initial slope.

* * * * *

UNITED STATES PATENT AND TRADEMARK OFFICE
CERTIFICATE OF CORRECTION

PATENT NO. : 5,277,401
DATED : January 11, 1994
INVENTOR(S) : Ronald G. Butler, et al.

It is certified that error appears in the above-identified patent and that said Letters Patent is hereby corrected as shown below:

Col. 4, line 1, delete "an" and substitute therefor --and--; Col. 4, line 7, delete "rain" and substitute therefor --drain--; Col. 4, line 20, delete "notary" and substitute therefor --unitary--; Col. 4, line 29, delete "rain" and substitute therefor --drain--; Col. 4, line 41, delete "least" and substitute therefor --lowest--; Col. 4, line 43, delete "pat" and substitute therefor --part--; Col. 4, line 50, delete "packets" and substitute therefor --pockets--; Col. 6, line 1, delete "angel" and substitute therefor --angle--; Col. 6, line 10, delete "vale" and substitute therefor --valve--.

Signed and Sealed this

Fifteenth Day of November, 1994

Attest:

BRUCE LEHMAN

Attesting Officer  Commissioner of Patents and Trademarks